United States Patent [19]

Gunter

[11] Patent Number: 5,044,588
[45] Date of Patent: Sep. 3, 1991

[54] MAP HOLDER

[76] Inventor: Tod D. Gunter, R.D. #1, Box 3080, Bristol, Vt. 05443

[21] Appl. No.: 566,241

[22] Filed: Aug. 13, 1990

[51] Int. Cl.⁵ .............................................. G09F 3/00
[52] U.S. Cl. .................. 248/214; 224/30 A; 248/340; 248/222.4
[58] Field of Search ..................... 248/214, 215, 222.4, 248/340; 224/30 A, 30 R, 273; 40/904, 643, 648, 661, 360

[56] References Cited

U.S. PATENT DOCUMENTS

| | | | |
|---|---|---|---|
| 605,969 | 6/1898 | McCafferty | 40/643 X |
| 1,534,151 | 4/1925 | Bahsler | 40/904 X |
| 1,730,790 | 10/1929 | Squires . | |
| 1,733,293 | 10/1929 | Brow | 40/643 |
| 1,759,544 | 5/1930 | Croes | 40/904 |
| 2,253,649 | 8/1941 | Price | 248/222.4 X |
| 2,539,286 | 1/1951 | Thompson . | |
| 2,691,837 | 10/1954 | Gove | 40/904 X |
| 3,065,668 | 11/1962 | Leybourn et al. | 40/904 X |
| 3,553,864 | 1/1971 | Karlyn et al. | 40/904 X |
| 4,800,664 | 1/1989 | Marstall | 40/643 X |
| 4,828,151 | 5/1989 | Goss | 224/30 A |

Primary Examiner—Karen J. Chotkowski
Attorney, Agent, or Firm—Cohen, Pontani & Lieberman

[57] ABSTRACT

A map holder includes a map pouch, a carrier arrangement for holding the map pouch, and structure for mounting the carrier arrangement onto a vehicle member. The map pouch includes transparent material through which at least part of the map is viewable. and further includes a mounting strip along a perimeter of the pouch. The carrier arrangement comprises a pair of separable pouch-mounting members adapted, in a first position, to be secured together while securing between them the mounting strip of the pouch and, in a second position, to be separated from each other while allowing the pouch to be withdrawn from the carrier arrangement to allow a change of maps, for instance.

20 Claims, 2 Drawing Sheets

MAP HOLDER

BACKGROUND AND SUMMARY OF THE INVENTION

The present invention relates to a map holder for attachment to a vehicle member, and especially to a map holder that can be demounted from such vehicle member to enable easy map viewing.

For a bicycle rider riding a bicycle, it would be convenient for such rider to be able to remove a map holder that is demountably attached to one of the frame tubes of the bicycle, to permit map viewing while continuing to ride, or while stopped. It would be especially desirable if the map holder were mounted generally in line with the direction of bicycle travel, such as in line with the so-called "top tube", "seat tube" or "down tube" of the bicycle frame. In non-use, therefore, the map holder would fail to appreciably add wind drag on the bicycle.

It is, accordingly, an object of the invention to provide a map holder that, in a preferred form, can be demountably attached to a bicycle frame tube. The map holder of the invention, however, may be mounted to other parts of a bicycle, or to another vehicle altogether.

Briefly stated, the map holder of the invention comprises, in one form, a generally flat map pouch, a carrier arrangement for holding the map pouch, and a means for mounting the carrier onto a vehicle, preferably in a demountable manner. The map pouch includes transparent material through which at least part of the map is viewable, and further includes a mounting strip along a perimeter of the pouch. The carrier arrangement comprises a pair of separable pouch-mounting members adapted, in a first position, to be secured together while securing between them the mounting strip of the pouch and, in a second position, to be separated from each other while allowing the pouch to be withdrawn from the carrier arrangement for changing maps, for instance.

BRIEF DESCRIPTION OF THE DRAWING FIGURES

The foregoing and further objects and advantages of the invention will become apparent from a reading of the following description in conjunction with the accompanying drawings, in which.

DETAILED DESCRIPTION OF THE PREFERRED EMBODIMENTS

Figure 1:
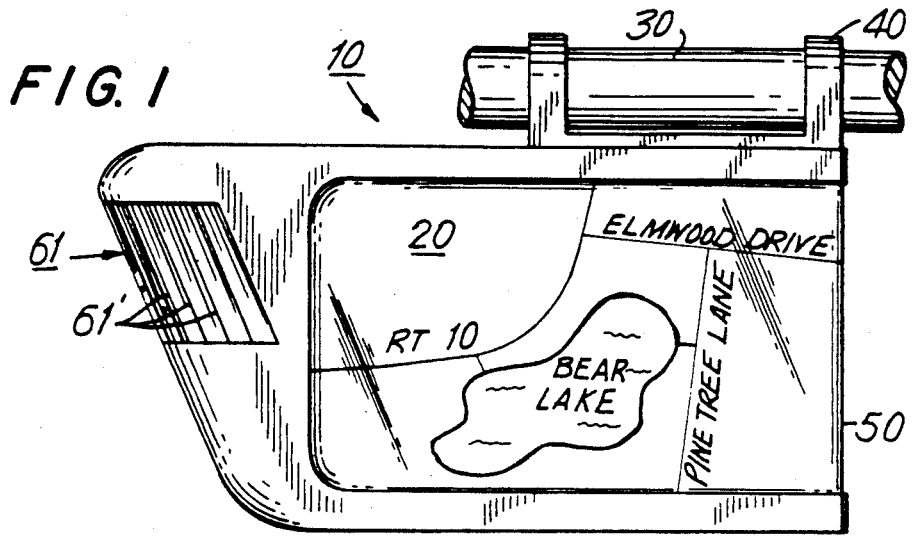
FIG. 1 is a plan view of a map holder as mounted on a tube of a bicycle frame or other vehicle member by means of a mounting bracket.

FIG. 1 shows a map holder 10 for displaying a map 20. The map holder 10 may be conveniently fixed to the so-called "top tube", "seat tube" or "down tube" of a bicycle frame, for example. A mounting bracket 40 connects the map holder 10 to the tube 30. Further details of the bracket 40 are described below.

The map holder 10 comprises a pouch 50 for containing the map 20, and which may be formed of vinyl with at least some portion transparent to enable viewing of the map 20 contained therein. The pouch 50 is supported by a carrier arrangement 60, which supports the pouch 50 in a manner described below.

The carrier arrangement 60 preferably includes a textured gripping area 61, and a companion textured gripping area (not shown) on the opposite side of the carrier arrangement 60 that is not shown. The textured gripping surfaces may be formed by ridges such as those indicated by the numeral 61'.

Figure 2:
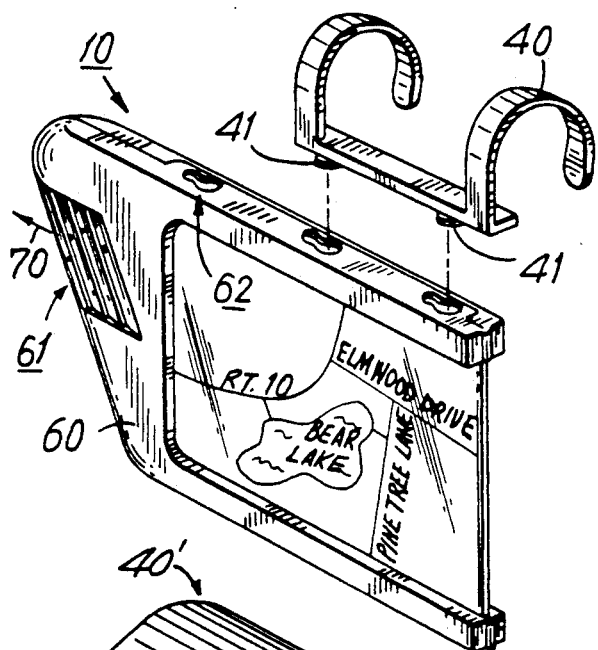
FIG. 2 is a perspective view of the map holder and associated mounting bracket of FIG. 1 showing details of how the map holder can be demountably attached to a mounting bracket.

The reason for providing the textured surface 61 will become more apparent from viewing FIG. 2, which shows the map holder 10 separated from the mounting bracket 40. Such bracket 40 would still be attached to a tube of a bicycle, for example. With bracket 40 attached to one of a top tube, a seat tube or a down tube of a bicycle frame, for example, which tubes are generally in line with the direction of bicycle travel, a bicycle rider while riding or stopped may conveniently grip the textured surface 61 of the map holder 10, and by pulling such map holder in the direction of an arrow 70, relative to the bracket 40, demount the map holder from such bracket. Alternatively, where bracket 40 is sufficiently resilient as to demount easily from a bicycle frame tube (e.g. 30, FIG. 1), the bicycle rider can grip the textured surface and remove the carrier arrangement and mounting bracket from a bicycle frame tube. This allows the bicycle rider to maneuver the map to a convenient viewing position.

Figure 2A:
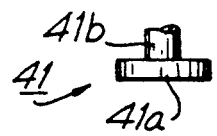
FIGS. 2A and 2B are respective detail views of a mounting shank and associated aperture of, respectively, the mounting bracket and the map holder of FIG. 2.
Figure 2B:
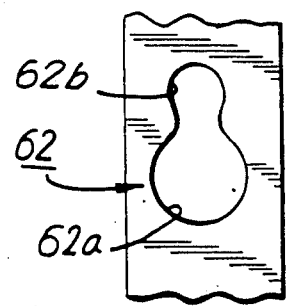

The map holder 10 can be demounted from the bracket 40 through the cooperation of shanks 41 of the bracket 40, which extend into, and are held within, an adjacent pair of apertures 62 formed in the carrier 60. A shank 41 and aperture 62 are detailed in FIGS. 2A and 2B, respectively. Shank 41 comprises an enlarged head region 41a and a relatively narrower neck portion 41b. The cooperating aperture 62 comprises a main aperture 62a for allowing passage therethrough of the head 41a of shank 41, and a narrowed region 62b for allowing a surrounding portion of the carrier arrangement 60 to engage the shank 41.

A typical bicycle includes a pair of bosses (not shown) attached to one of the mentioned bicycle frame tubes and respectively containing female threaded portions into which respective bolts may be screwed for supporting a water bottle carrier to the bicycle tube. FIG. 2C shows a suitable bolt 80, which may be screwed into one of the mentioned bosses, to provide a substitute for the mounting bracket 40 and its shank 41. The bolt 80 includes an enlarged head region 81a, an adjoining narrowed neck region 81b, and a threaded portion 81c for being threadedly received into one of the mentioned bosses. The screw 80 functions in essentially the same manner as shank 41.

Figure 2D:
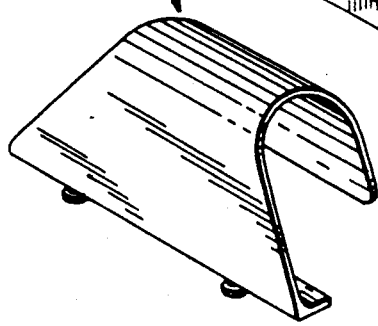
FIG. 2D shows an alternative mounting bracket to that shown in FIG. 2.
Figure 2C:
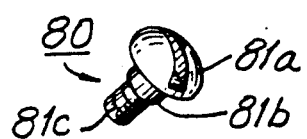
FIG. 2C shows an alternative mounting shank to that shown in FIG. 2A.

FIG. 2D shows an alternative configuration 40 for the mounting bracket 40 of FIG. 2, which functions in the same general way as the bracket 40.

Figure 3:
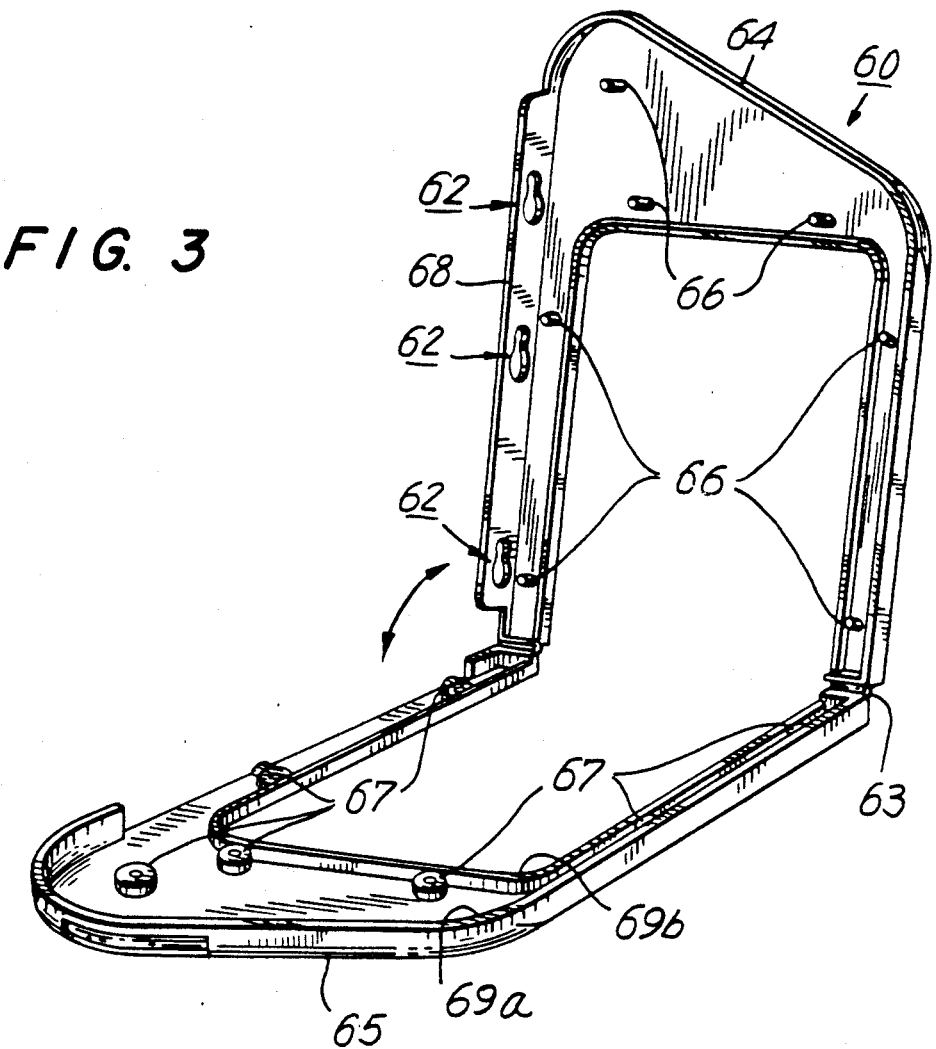
FIG. 3 is a perspective view of a carrier arrangement used in the map holder of FIGS. 1 and 2, and showing separable first and second sides of such carrier arrangement.
Figure 4:
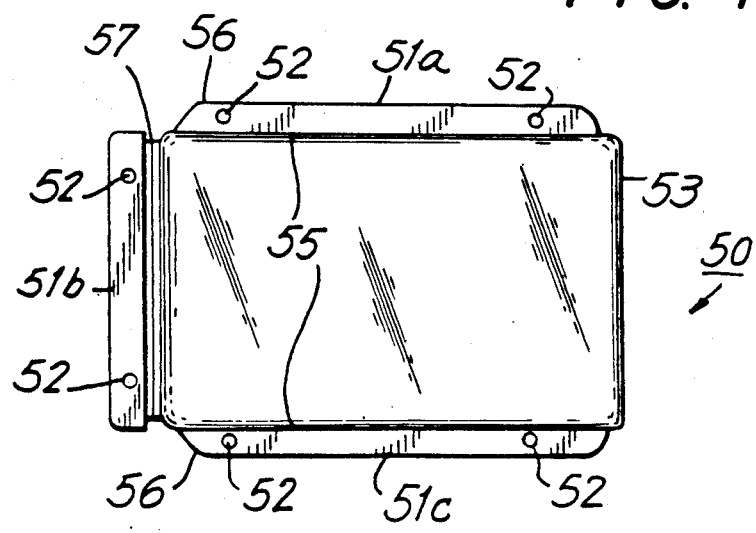
FIG. 4 is a plan view of a preferred form of map pouch that can be retained within the carrier arrangement of FIG. 3.

FIG. 3 shows the carrier arrangement of FIG. 1 in an open position and without the map pouch 50, while FIG. 4 shows details of such map pouch 50.

The carrier arrangement 60 (FIG. 3) preferably comprises a pair of hinges at 63, which are preferably biased to snap into an open position, as shown, when cooperating sides 64 and 65 of the carrier arrangement 60 are separated from each other in the state shown.

To hold the two sides 64 and 65 of the carrier arrangement 60 together, side 64 includes a plurality of pegs 66 projecting toward a respective plurality of female receptacles 67 on side 65 of the carrier arrangement 60. The pegs 66 are received within receptacles 67 with a snap fit, in a manner known per se, to cause the carrier arrangement sides 64 and 65 to remain integrally joined together during use, but to allow a user to easily separate the sides 64 and 65 when desired for replacing the map pouch 50 (FIG. 4).

Further features of the carrier arrangement 60 (FIG. 3) are the extension 68 from side 64 for including the apertures 62 (discussed above); and the extensions 69a and 69b from the carrier arrangement side 65, which provide suitable spacing for inclusion of female receptacle 67 on such side.

A preferred material for construction of the carrier arrangement 60 is reinforced resin.

FIG. 4 illustrates a preferred form of a map pouch 50. The pouch includes mounting strips 51a, 51b and 51c along a perimeter of the pouch 50. Each mounting strip 51a–51c may include a pair of apertures 52, which register with, and receive, the mounting pegs 66 (FIG. 3) of the carrier arrangement 60. Such mounting pegs project through the apertures 52 of the map pouch 50 to thereby secure such pouch within the carrier arrangement 60 when the sides 64 and 65 of such arrangement are brought together.

The map pouch 50 may conveniently be formed from a single sheet of vinyl folded at fold line 53 and provided with seams 55 and optional further seams 56. The mounting strip 51b comprises a second side (not shown) located behind and separated from the illustrated side to permit map access to the pouch. A zipper-type closure 57, shown diagrammatically, and commonly known as a Zip-Lock enclosure, may be used in the vicinity of mounting strip 51b, if desired.

In use the map pouch 50 would be opened by separating the shown and unshown portions of the mounting strip 51b; this would open the zipper-type enclosure 57, if present, and allow access to the inside of the pouch 50 for changing maps. The map pouch 50 is then placed within the carrier arrangement 60 of FIG. 3, with the mounting pegs 60 passing through apertures 52 in the pouch 50. The thus-formed map holder 10 (FIG. 2) may be then conveniently attached to the mounting bracket 40, by way of example.

Referring again to the carrier arrangement 60 of FIG. 3, such portions of the carrier arrangement sides 64 and 65 that secure between them the mounting strips 51a–51c (FIG. 4) of the map pouch 50 are defined herein as pouch-mounting members.

The foregoing describes a map holder which, in a preferred form, can be demountably attached to a vehicle. This permits convenient map viewing upon demounting the map holder, and such map holder can then easily be re-attached to the vehicle.

It should be understood that the preferred embodiments and examples described are for illustrative purposes only and are not to be construed as limiting the scope of the present invention which is properly delineated only in the appended claims.

What is claimed is:

1. A map holder, comprising:
   (a) a generally flat pouch for holding a map, said pouch including transparent material through which at least part of the map is viewable; said pouch further including a mounting strip along a perimeter of said pouch; said mounting strip being provided with spaced apertures;
   (b) a carrier arrangement for holding said map pouch, said carrier arrangement comprising a pair of separable pouch-mounting members, said pouch-mounting members being adapted, in a first position, to be secured together while securing between them said mounting strip of said pouch and, in a second position, to be separated from each other while allowing the pouch to be withdrawn from said carrier;
   (c) a first of said separable pair of pouch-mounting members including pegs for respectively passing through said spaced apertures in said mounting strip of said pouch to thereby secure the pouch when said pouch-mounting members are in said first position; and
   (d) means for mounting said carrier onto a vehicle member.

2. The map holder of claim 1, wherein said carrier arrangement includes a gripping region that is large relative to said pouch-mounting members and that is positioned adjacent said map pouch.

3. The map holder of claim 2, wherein said gripping region includes a surface that is textured to promote positive gripping.

4. The map holder of claim 1, wherein said carrier arrangement further includes a pair of hinges for enabling hinged movement between said pouch-mounting members from said first position to said second position, and vice versa.

5. The map holder of claim 1, wherein a second of said separable pair of said pouch-mounting members includes female receptor apertures for snugly but separably receiving said pegs of said first pouch-mounting member.

6. The map holder of claim 1, wherein said means for mounting said carrier onto a vehicle member comprises means for demountably attaching said carrier to the vehicle member.

7. The map hold of claim 6, wherein said means for demountably attaching said carrier to the vehicle member comprises resilient means for gripping a tube of a bicycle.

8. The map holder of claim 6, wherein said means for demountably attaching said carrier onto the vehicle member comprises a portion of said carrier arrangement having a pair of apertures, each aperture having a region for allowing an enlarged head of a mounting shank to pass therethrough and a narrowed region for allowing the surrounding carrier arrangement portion to engage the mounting shank.

9. The map holder of claim 8, in combination with a pair of mounting shanks each of the type described.

10. The map holder of claim 1, wherein a portion of a perimeter of said map pouch on which said perimeter mounting strip is located is free of a mounting strip.

11. The map holder of claim 10, wherein said pouch is arranged such that said perimeter mounting strip generally defines a U-shape.

12. The map holder of claim 1, wherein said pouch is flexible relative to the carrier arrangement.

13. The map carrier of claim 1, wherein said pouch has an opening for map access which is adapted to be secured between said pair of pouch-mounting members so as to prevent a map in the pouch from leaving the pouch when said pouch-mounting members are in the first position.

14. The map holder of claim 13, wherein said opening of said pouch is independently provided with a sealing means.

15. The map holder of claim 14, wherein said sealing means has a zipper-type construction.

16. The map holder of claim 1, wherein said vehicle member comprises a tube of a bicycle that is generally in line with the direction of bicycle travel.

17. A map holder comprising:
   (a) a generally flap pouch for holding a map, said pouch including transparent material through which at least part of the map is viewable; said pouch further including a mounting strip along a fractional portion of a perimeter of said pouch; said mounting strip being provided with spaced apertures;
   (b) a carrier arrangement for holding said map pouch and being rigid relative to the pouch, said carrier arrangement comprising a pair of separable pouch-mounting members, said pouch-mounting members being adapted, in a first position, to be secured together while securing between them said mounting strip of said pouch and, in a second position, to be separated from each other while allowing the pouch to be withdrawn from said carrier;
   (c) a first of said separable pair of pouch-mounting members including pegs for respectively passing through said spaced apertures in said mounting strip of said pouch to thereby secure the pouch when said pouch-mounting members are in said first position; and
   (d) means for detachably mounting said carrier onto a vehicle member.

18. The map holder of claim 17, wherein said vehicle member comprises a tube of a bicycle that is generally in line with the direction of bicycle travel.

19. The map hold of claim 18, wherein said means for demountably attaching said carrier to the vehicle member comprises resilient means for gripping a tube of a bicycle.

20. The map holder of claim 17, wherein a second of said separable pair of said pouch-mounting members includes female receptor apertures for snugly but separable receiving said pegs of said first pouch-mounting member.

* * * * *